June 29, 1937.　　　D. G. MAGILL　　　2,085,034
METHOD OF MANUFACTURING FIBER CONTAINERS
Filed Nov. 13, 1935　　　3 Sheets-Sheet 1
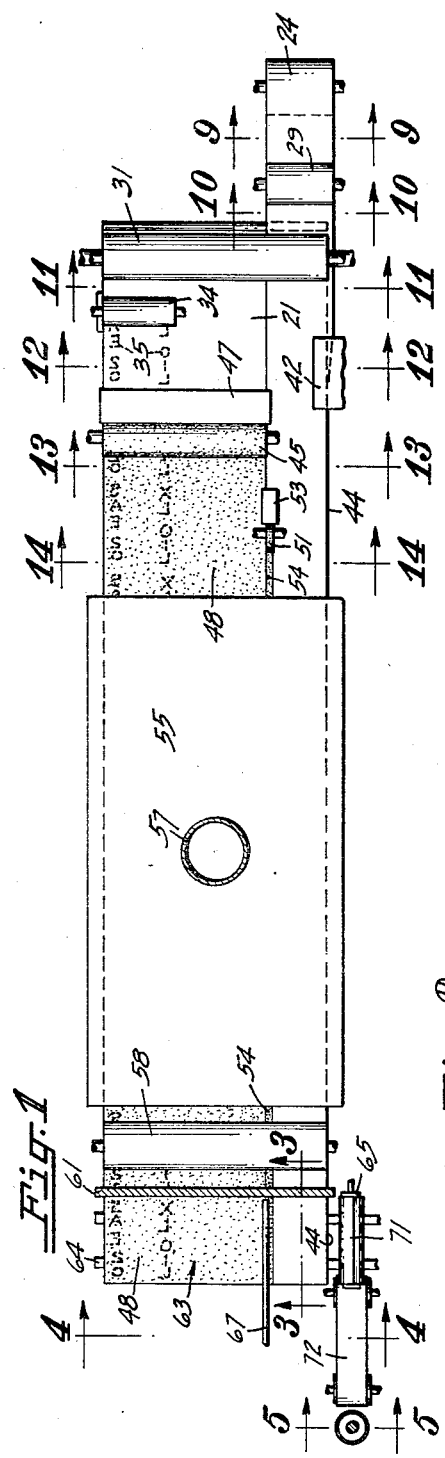
INVENTOR
Donald G. Magill
BY
ATTORNEYS June 29, 1937.  D. G. MAGILL  2,085,034
METHOD OF MANUFACTURING FIBER CONTAINERS
Filed Nov. 13, 1935  3 Sheets-Sheet 2
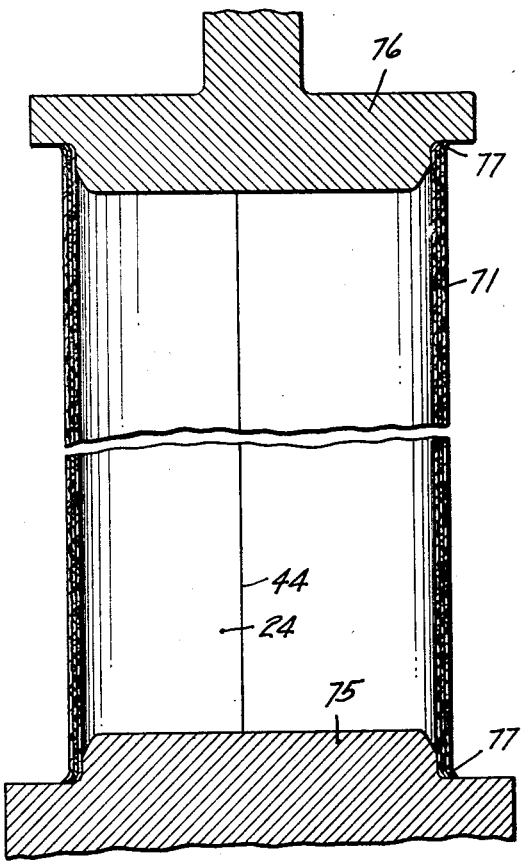
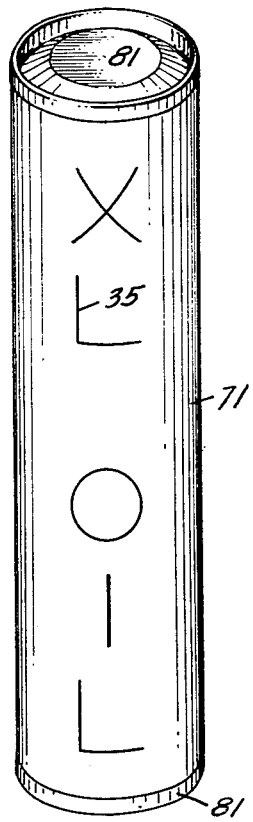
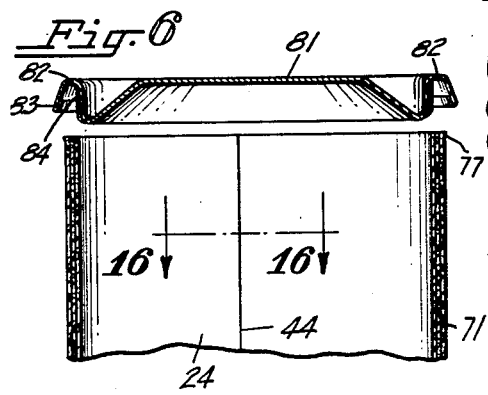
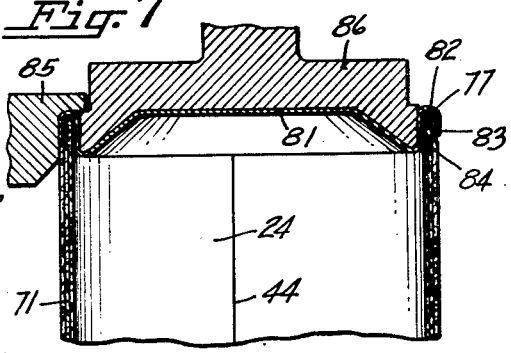

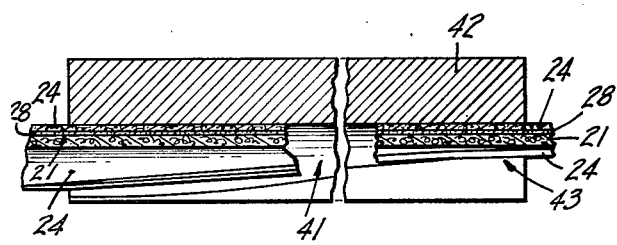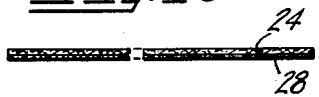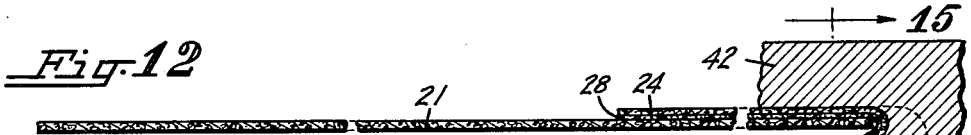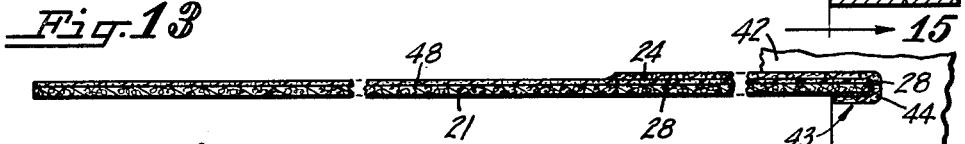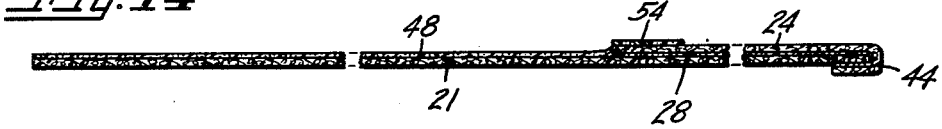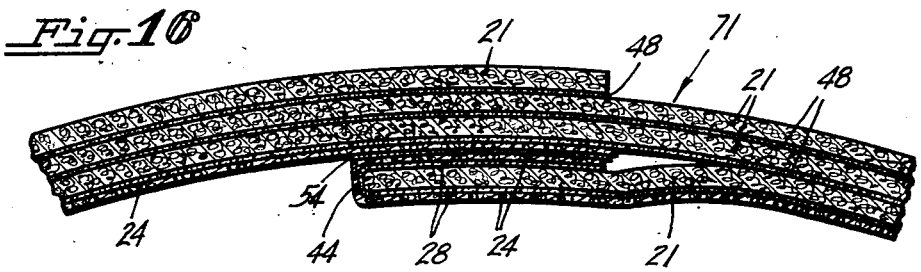

Patented June 29, 1937

2,085,034

UNITED STATES PATENT OFFICE 2,085,034

METHOD OF MANUFACTURING FIBER CONTAINERS

Donald G. Magill, Great Neck, N. Y., assignor to American Can Company, New York, N. Y., a corporation of New Jersey Application November 13, 1935, Serial No. 49,596

19 Claims. (Cl. 93—39.1)

The present invention relates to the method of manufacturing fiber containers and has particular reference to the manufacture of containers or cans and can parts having laminated bodies of fibrous material and metallic end closures, such containers or cans being particularly adapted to hold oil, grease and similar products, the method being adapted to the fabrication of a fiber body container having the proper oil proofing interior wall formed as a lining to the body and in such a manner as to prevent any seepage of the oil out of the can.

The fiber container of the instant invention is fabricated in a series of steps and by means of a method which insures a continuous uninterrupted manufacture and which produces a fibrous body of laminated form which is so made as to have sufficient strength for the purpose and which is also provided with an oil proof interior lining such as parchment, glassine, cellophane, or other oil proofed fiber material which is so applied to the body wall stock as to form the interior wall or part of the body which contacts directly with the oil, the steps providing for a simple and uninterrupted production of body stock, body blanks, fibrous bodies and cans.

An object of the present invention is the provision of method steps wherein relatively cheap fiberboard material such as chipboard, kraft, jute or the like is subjected to various operations including the application and securing in place of an oil proof parchment or similar lining element along one side of the fiberboard, the composite stock thus produced being subjected to the further steps of forming blanks, can bodies and cans.

Another object of the invention is the provision of a folding step for properly locating the parchment lining in place upon the body stock fiberboard so that the parchment extends over one edge and is secured in that position.

A further object of the invention is the provision of manufacturing steps for creating such fibrous containers and at the same time printing upon a portion of the fiberboard section to provide a satisfactory label for the can.

Another object of the invention is the provision of a method of forming fibrous can bodies by producing a composite body wall formed with a body stock such as fiberboard and a lining element such as parchment and includes also the steps of applying a remoistening glue to the stock and also a remoistening side seam oil proof adhesive substance so that a proper blank is first fully prepared and need only be wound on a suitable mandrel to provide a laminated can body structure having an oil proof inner wall and a fiberboard strengthening outer wall or walls.

Yet another object of the invention is the provision of manufacturing steps for producing such body blanks after which the blanks are subjected to moistening means just prior to and during the time they are being formed into bodies to the end that the various laminations of the can body are properly secured together and the edges of the interior parchment lining are properly joined in an oil proof side seam to produce a can body having an oil proof interior and a laminated supporting exterior structure.

Another object of the invention is the provision of manufacturing steps including the formation of a can from a can body of the character described by the uniting of metal ends for bottom and for top in such manner as to insure a leak-proof oil connection between the body stock and the metal ends.

Numerous other objects and advantages of the invention will be apparent as it is better understood from the following description, which, taken in connection with the accompanying drawings, discloses a preferred embodiment thereof.

Referring to the drawings:

Figures 1 and 2 are schematic views illustrating the steps of providing a fibrous can body in accordance with the present invention, Fig. 1 being a plan view of sufficient apparatus elements for carrying out such steps and Fig. 2 being a schematic elevation of these parts;

Fig. 3 is a fragmentary detail partially in section taken substantially along the line 3—3 in Fig. 1 and showing the severing of a blank from the composite fibrous stock and also showing the remoistening of the glue previously applied to parts of the body stock;

Fig. 4 is a section detail taken substantially along the line 4—4 in Fig. 1 and illustrating the feeding of a body blank to the forming mechanism, this view also showing the remoistening of the glue on the body stock;

Fig. 5 is a longitudinal section taken through a laminated body formed from the fibrous stock and showing the body being subjected to a flanging die action, this being an enlarged section taken substantially along the line 5—5 in Fig. 1;

Fig. 6 is a sectional view of the formed can body and its can end in position preparatory to the assembling of these can parts;

Fig. 7 is a similar view illustrating the complete assembly of body and end;

Fig. 8 is a perspective view of the completed can;

Figs. 9 to 14, inclusive, are transverse sectional views taken through the fibrous and parchment composite body stock material, these views illustrating various stages of development in the operation of producing the container blank, the sections being designated as views taken substantially along the respective section lines 9—9, 10—10, etc., up to and including 14—14 all shown in Fig. 1;

Fig. 15 is a sectional detail taken substantially along the line 15—15 in Fig. 12 and illustrating the folding over of the edge of the parchment upon the fiberboard body; and Fig. 16 is a sectional view on an enlarged scale and taken along the line 16—16 of Fig. 6, of a portion of the container body and illustrating the relative position of the fiberboard and the parchment and also showing the intervening layers of glue and adhesive.

In the drawings there is illustrated sufficient apparatus to indicate the various process steps used in the manufacture of a fibrous body which in turn is united with metal ends to produce an oil proof and grease proof container, the drawings illustrating in some detail the container blank, the container body and the container, these exemplifying the results of the various operating steps of the method invention.

In the manufacture of a suitable oil proof and grease proof fibrous package, a fibrous sheet material which is best handled in continuous roll form is advanced through various rollers disposed at various operating stages and during the advancement of this body stock the same is altered and is united with other elements until the final results are obtained.

In Figs. 1 and 2 there is disclosed a continuous web of fibrous material 21 which may be chipboard, kraft, jute or other relatively cheap and strong fibrous stock and this is fed from a supply roll 22 and carried up and over a lower feed roller 23. A strip of oil proof material such as parchment 24 is similarly fed from a supply roll 25 and is brought into engagement and secured to the fiberboard 21.

The parchment is preferably fed over a roller 26 which rotates in a bath of oil proof adhesive contained within a tank 27. This roller applies a film of adhesive to the lower surface of the parchment such a film being indicated by the numeral 28 (Fig. 10). The roller 26 is in vertical alignment and directly under a pressure roller 29 beneath which the parchment passes.

The parchment 24 is much less in width than the fiberboard 21 and is brought into engagement with the latter along one edge. This engagement takes place as the parchment passes under a pressure roller 31 which is in vertical alignment and directly over the roller 23, the cooperative action of the rollers pressing the parchment and the fiberboard together with the under surface of the parchment, which contains the oil proof adhesive, brought down against the upper surface of the fiberboard and adjacent its edge.

Both the parchment and the fiberboard pass over the roller 23 in a direction toward the left as viewed in Figs. 1 and 2 and continue from that point in sealed relationship and throughout the various subsequent operations.

It is sometimes desirable to print a label upon the body stock which enters into the manufacture of the oil and grease proof can now under consideration and when this is done the printing action may take place just after the composite body stock has passed from the rollers 23, 31. The printing in this case is done on the under side of the fiberboard and adjacent its free edge, i. e., the edge opposite the parchment.

Such printing may be accomplished by a suitable printing device 32 which includes a printing roller 33. The printing roller engages the under surface of the fiberboard and is backed up by a roller 34 which rides on the upper surface of the fiberboard. A suitable label design as indicated at 35 (Figs. 1 and 8) is thus impressed upon the fiber wall.

The parchment 24 as it is applied to the edge of the fiberboard 21 extends over this edge a slight distance as illustrated on the right hand side of Fig. 11. As fiberboard and parchment advance through the next operative step of manufacture this overhanging edge of the parchment (containing the film of adhesive 28) is carried into and along a groove 41 (Figs. 12 and 15) of a folding device 42 (see also Figs. 1 and 2).

As the overhanging parchment edge is moved longitudinally through the groove it is gradually folded under the edge of the fiberboard, the groove 41 becoming narrower at its forward or exit end. The exit end of the groove as at 43 (Figs. 13 and 15) is such as to cause the folded edge of the parchment to be bent under and up against the lower surface of the fiberboard. The adhesive 28 is on the inside of the folded edge of the parchment and this secures the parchment in place over the edge of the fiberboard and forms a bent-over portion as at 44.

The composite stock next passes between rollers 45 and 46, the former constituting a glue applying roller the glue being supplied from a suitable reservoir 47. This glue is preferably a remoistening glue and is applied in film form to the upper surface of the stock, as indicated by the numeral 48 (Figs. 1 and 13). This glue covered surface extends from the unfolded edge of the parchment strip to the free edge of the fiberboard this glue area being on the top side of the fiberboard and directly above the printing 35. The glue is dried before it is to be utilized as an adhesive, as will be hereinafter more fully described.

It is the parchment strip 24 that will constitute the oil and grease proof interior wall of the container and in order to insure that there is no gap or break in an oil or grease proof joint between the meeting edges of the continuous parchment wall, it is advisable to apply an oil proof remoistening side seam adhesive along the edge of the parchment but just next to the glued surface of the fiberboard. Accordingly the composite strip is next passed between rollers 51, 52, the former constituting an adhesive applying roller. Oil proof remoistening side seam adhesive is distributed by the roller 51 from a supply tank 53.

The roller 51 is a relatively narrow roller and is located so that the edge of the parchment 24 passes directly beneath the roller and in so doing a narrow band or strip of side seam adhesive, indicated by the numeral 54 in Figs. 1 and 14, is deposited upon the edge of the parchment. This adhesive, like the glue 48 previously deposited upon the surface of the fiberboard, is of a remoistening variety and both glue and adhesive are preferably dried before further use.

The composite strip passes through a drying oven 55 (Figs. 1 and 2). Heat may be applied to the lower surface of the oven as by a gas burner or other suitable means indicated by the numeral 56. This heats the oven and it is through a heated atmosphere that the strip is conveyed as it passes through the oven, provision being made for venting of the volatile gases during the drying as through the flue 57.

The composite strip is caused to move through the various stages just described in any suitable manner and after the dried composite strip passes from the oven it may be received in drawing or feeding rollers 58, 59 which thence advance it into a cutting station (Figs. 1, 2, 3 and 4).

At the cutting station the composite strip passes between cutting members 61, 62 which sever a can body blank 63 from its forward end. At this time the blank may come to rest in suitable feeding mechanism as disclosed by feed bars 64, which are used in this description to exemplify a succeeding step in the process, or it may be stacked and stored until it is needed in the subsequent forming of a can body.

In forming the blank into a container body, this being a succeeding step as suggested above, the folded edge 44 of the blank is moved into engagement with a forming mandrel 65 (Figs. 1 and 4) of any suitable laminated paper winder, there being many satisfactory well known types on the market. The proper feeding of the blank to the mandrel is effected by movement of the feed bars 64 and in the winding action which follows the parchment section of the blank is carried in direct contact with the surface of the mandrel.

During feeding of the blank over the mandrel the remoistening glue 48 and the remoistening adhesive strip 54 are moistened. This result is preferably obtained by passage of the blank beneath steam jets 66 (Figs. 3 and 4) which moisten both the remoistening glue and the remoistening side seam adhesive. Steam for the steam jets may be supplied from a steam pipe 67.

Winding of the blank results in the production of a laminated can body 71, the parchment 24 being in position and functioning as an interior wall for the can which will be formed from this body. The parchment is lapped at its ends as best shown in Fig. 16. The overlapped position of the parchment locates its remoistening side seam adhesive 54 between the inside edge of the parchment on which the adhesive was applied and its folded edge 44. This means that the parchment surface extends continuously as the inside wall of the can body with the exception of the joint between the parchment ends which joint is filled in by the oil and grease proof adhesive 54. Accordingly the entire inner surface of the can body is oil proof.

The part of the blank which is contiguous to the parchment covered front section is wound into the close laminated form of the laminated body 71 with the remoistened glue 48 between its contacting surfaces. This unites the adjacent walls of the fiberboard in a rigid and exceedingly strong wall structure. The can body wall which is illustrated in section in Fig. 16 by way of example only, thus comprises three thicknesses of laminations there being a sufficient overlap of the outer ply to produce this full three ply structure for the entire can body wall.

In order to convert the laminated body 71 into a can capable of holding oil, grease and similar products it is first advisable to flange slightly the upper and lower ends of the body. Conveyor 72 (Figs. 1 and 2) suggests the transfer of the laminated body to the next station where such flanging operation may take place. This flanging operation may be done in various ways as by cooperating flanging pads 75, 76 best illustrated in Fig. 5. The resulting flanged body thus has its ends outwardly flared as at 77 (see also Fig. 6).

The bottom end of the can is first applied and after the can has been filled with oil, grease, etc., the top end, which is of the same construction as the bottom, is applied in a similar manner. Figs. 6 and 7 indicate the step of applying an end which may be either bottom or top to the fiber body.

A suitable can end to be used either for bottom or top of the can comprises an end member 81 which is preferably formed of sheet metal. If desired the metal sheet from which the end is made may be suitably coated. The can end is formed with an annular flange 82 and its outer edge is preferably bent in or hemmed as at 83.

The inner wall of the annular flange 82 is preferably lined with an oil proof resilient sealing compound 84 which may be applied in any suitable manner. It is advisable that the compound be fairly well distributed along this inner wall of the flange as illustrated in Fig. 6. The outer wall of the flange is slightly flared to permit easy insertion of the flared end 77 of the can body 71 when the end member is applied to the body.

In inserted position the end of the body 71 is located within the annular channel of the can end flange 82 and the compound lining 84 is confined between the wall of the end flange and the inner wall of the flared end 77 of the can body. The can end flange is then squeezed tight on the can body as by a seaming roller 85 which presses against the outer wall of the flange and imbeds the hemmed edge 83 of the end into the outer laminated wall of the can body. A chuck 86 provides the proper backing up element for forming this crimping of the can end upon the can body.

After a bottom has been put on the can body the can is in condition to be filled with oil, grease or some other products. After the can is filled the second can end is applied as a top or cover. The sealed container is illustrated in Fig. 8 of the drawings which shows how the label 35 appears on the outside of the can.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. The process of manufacturing body blanks for use in containers for holding oil, grease and similar products which comprises, uniting a portion of one side only of a fibrous sheet material such as fiberboard with oil proof parchment by means of oil proof adhesive so that the parchment extends beyond one edge of the fiberboard, the remaining portion of said fibrous sheet material being left free of parchment on both sides thereof, and then folding the projecting edge of the parchment over the edge of the fiberboard and pasting it to the latter, to produce a body stock having an oil proof parchment lining on one side and extending over one edge.

2. The process of manufacturing body blanks for use in containers for holding oil, grease and similar products which comprises, uniting a fibrous sheet material such as fiberboard with oil proof parchment by means of oil proof adhesive, the parchment being applied to one face of the fiberboard adjacent one edge thereof and extending beyond said edge, folding the projecting edge of the parchment over the edge of the fiberboard and pasting it to the latter, applying remoistening glue over the remaining section of the surface of said fiberboard, and drying said glue to produce a composite body blank capable of being wound into laminated form with said glue interposed between the laminations and said parchment forming an interior lining.

3. The process of manufacturing body blanks for use in containers for holding oil, grease and similar products which comprises, pasting a strip of parchment to one side and along one edge of fibrous sheet material such as fiberboard so that one edge of said parchment strip projects beyond the edge of said fiberboard, folding the projecting edge of the parchment over the edge of the fiberboard and pasting it to the latter, applying remoistening glue alongside of said parchment strip and directly on the fiberboard, applying an oil proof remoistening side seam adhesive directly to and extending along the edge of said parchment adjacent to said remoistening glue, and drying said glue and said adhesive to produce a composite body stock.

4. The process of manufacturing body blanks for use in containers for holding oil, grease and similar products which comprises, pasting a strip of parchment to one side and along one edge of fibrous sheet material such as fiberboard so that one edge of said parchment strip projects beyond the edge of said fiberboard, folding the projecting edge of the parchment over the edge of the fiberboard and securing it to the latter, applying remoistening glue to that part of the surface on the one side of said fiberboard which is not covered by said parchment strip, applying a narrow strip of an oil proof remoistening side seam adhesive directly to and along the edge of said parchment, and drying said glue and said adhesive to produce a composite body blank.

5. The process of manufacturing body blanks for use in containers for holding oil, grease and similar products which comprises pasting a strip of parchment to one side and along one edge of fibrous sheet material such as fiberboard so that the adjacent edge of said parchment strip projects beyond the edge of said fiberboard, printing a selected label directly on the opposite side of said fiberboard, folding the projecting edge of the parchment over the edge of the fiberboard and pasting it to the latter, applying remoistening glue to said fiberboard and to that part of its surface not covered by said parchment strip, applying a narrow band of an oil proof remoistening side seam adhesive directly to and along the edge of said parchment, and drying said glue and said adhesive.

6. The process of manufacturing body blanks for use in containers for holding oil, grease and similar products which comprises pasting a strip of parchment on one side and along one edge of fibrous sheet material such as fiberboard so that the adjacent edge of said parchment strip projects beyond the edge of said fiberboard, printing a suitable label directly on the opposite side of said fiberboard, folding the projecting edge of the parchment over the edge of the fiberboard and pasting it to the latter, applying remoistening glue on the unprinted side of said fiberboard, applying an oil proof remoistening side seam adhesive along the edge of said parchment which is adjacent to said remoistening glue, drying said glue and said adhesive, and severing a section from said composite sheet material to provide the container blank.

7. The process of manufacturing bodies of containers for holding oil, grease and similar products which comprises uniting a portion of one side only of a fibrous sheet material such as fiberboard with oil proof parchment by means of oil proof adhesive so that the parchment extends over an edge of the fiberboard, the remaining portion of said fibrous sheet material being left free of parchment on both sides thereof, folding the projecting edge of the parchment over the edge of the fiberboard and pasting it to the latter, and forming the said united elements into tubular container bodies with said parchment on the inside.

8. The process of manufacturing multi-ply container bodies for holding oil, grease and similar products which comprises uniting a portion of one side only of a fibrous sheet material such as fiberboard with a narrower strip of oil proof parchment by means of oil proof adhesive so that the parchment strip extends over an edge of the fiberboard, the remaining portion of said fibrous sheet material being left free of parchment on both sides thereof, folding the projecting edge of the parchment over the edge of the fiberboard and pasting it thereto, applying glue to one side of the said fiberboard and in the region not covered by said parchment strip, and forming the said composite sheet material into a container body having said parchment as its interior wall only and having said fiberboard wound into a plurality of outer laminations having only the said glue surface therebetween.

9. The process of manufacturing multi-ply container bodies for holding oil, grease and similar products which comprises uniting a portion of one side only of a fibrous sheet material such as fiberboard with a narrower strip of oil proof parchment by means of oil proof adhesive so that the parchment strip extends over an edge of the fiberboard, the remaining portion of said fibrous sheet material being left free of parchment on both sides thereof, folding under the projecting edge of the parchment and pasting its terminal section to the opposite side of the fiberboard, applying glue to one side of and on that portion of the surface of the said fiberboard which is not covered by said parchment strip, and forming the said composite sheet material into tubular shape as a container body the while moistening said glue, said body having said parchment as its interior wall only and having the fiberboard sheet wound into a plurality of outer laminations fastened together by said moistened glue.

10. The process of manufacturing bodies of containers for holding oil, grease and similar products which comprises pasting a strip of parchment to one side and along one edge of fibrous sheet material such as fiberboard by means of an oil proof adhesive and having one edge of said parchment strip projecting beyond the edge of said fiberboard, folding the projecting edge of the parchment over the edge of the fiberboard and pasting the overlapping section to the other side and edge thereof, applying remoistening glue to that side of said fiberboard on which the parchment is secured and to that section not covered by said parchment, drying said glue, and winding said composite material into tubular form the while moistening said remoistening glue to produce a glued laminated container body having said parchment as its interior wall.

11. The process of manufacturing bodies of containers for holding oil, grease and similar products which comprises pasting a strip of parchment to one side of fibrous sheet material such as fiberboard by means of an oil proof adhesive so that one edge of said parchment strip projects beyond the edge of said fiberboard, folding the projecting edge of the parchment strip over the edge of the fiberboard and securing the overlapping section to the opposite side of the latter, applying remoistening glue on one side of said fiberboard and adjacent the parchment, applying an oil proof remoistening side seam adhesive along one edge of said parchment, drying said glue and said adhesive, moistening said glue and said adhesive and winding said composite material into tubular form to produce a laminated container body having said parchment as its interior wall and having the meeting and closed side seam edges thereof joined by said oil proof remoistening side seam adhesive.

12. The processs of manufacturing multi-ply container bodies for holding oil, grease and similar products which comprises uniting a portion of one side only of a fibrous sheet material such as fiberboard with a lesser width oil proof parchment by means of oil proof adhesive, one edge of the parchment extending over an edge of the fiberboard, the remaining portion of said fibrous sheet material being left free of parchment on both sides thereof, folding under the projecting edge of the parchment and pasting it to the fiberboard, severing a section from said composite sheet material to provide a container blank, and forming said blank into a container body by winding it into tubular shape with said parchment constituting the interior wall only and with the portion of said fiberboard which is not covered by the parchment constituting an outer lamination of said body.

13. The process of manufacturing multi-ply container bodies for holding oil, grease and similar products which comprises feeding flat fibrous sheet material such as fiberboard in a continuous line, feeding a sheet of oil proof parchment into contact with a portion of one face only of said fiberboard and with one edge extending beyond the fiberboard, the remaining portion of said fibrous sheet material being left free of parchment on both sides thereof, uniting the two sheets of fiberboard and parchment by means of an oil proof adhesive, folding the projecting edge of the parchment sheet over the edge of the fiberboard sheet and securing the two sheets together, cutting off an end of said composite sheet material to provide a container blank, feeding said cut blank at right angles to the line of travel of said composite sheet material, and winding said blank into laminated tubular form to provide a container body having said parchment as its interior wall.

14. The process of manufacturing multi-ply container bodies for holding oil, grease and similar products which comprises feeding flat fibrous sheet material such as fiberboard in a continuous web, feeding a sheet of oil proof parchment into contact with a portion of one face only of said fiberboard and with one edge extending beyond the same, the remaining portion of said fibrous sheet material being left free of parchment on both sides thereof, uniting the two sheets of fiberboard and parchment by means of an oil proof adhesive leaving a part of both surfaces of the fiberboard uncovered by parchment, folding the projecting edge of the parchment over the edge of the fiberboard and securing the folded part of the former to the fiberboard, applying glue on one side and to the uncovered surface of said fiberboard, cutting off the forward end of said composite sheet material to provide a container blank, feeding said cut blank at right angles to the line of travel of said composite web with its folded edge forward, shaping said blank over a forming mandrel with its parchment surface in engagement with the mandrel while winding said blank into laminated tubular form to provide a container body having said parchment sheet constituting the interior wall only and with the glue covered surface of said fiberboard in tight engagement with an adjacent lamination of fiberboard surface not so covered.

15. The process of manufacturing bodies of containers for holding oil, grease and similar products which comprises uniting a portion of one side only of a fibrous sheet material such as fiberboard with oil proof parchment by means of oil proof adhesive, the parchment being positioned on the fiberboard with one edge extending beyond the edge of the fiberboard, the remaining portion of said fibrous sheet material being left free of parchment on both sides thereof, folding the projecting edge of the parchment over the edge of the fiberboard and pasting it to the latter, printing a suitable label on the opposite side of said fiberboard, and forming the said composite sheet material into tubular container bodies with said parchment constituting the inside wall surface and with said printed label on the outside wall surface.

16. The process of manufacturing bodies of containers for holding oil, grease and similar products which comprises uniting a fibrous sheet material such as fiberboard with oil proof parchment, the parchment extending along one side of the fiberboard and with an edge projecting beyond the edge of the latter, folding under the projecting edge of the parchment and pasting it to the opposite side of the fiberboard, printing a suitable label on said opposite side of said fiberboard, applying remoistening glue to the unprinted side of the fiberboard and to the surface not covered by said parchment, drying said glue, and winding said composite material into tubular form the while moistening said remoistening glue to produce a laminated container body having said parchment as its interior wall and with said printed label on the exterior wall.

17. The process of manufacturing containers for holding oil, grease and similar products which comprises uniting a portion of one side only of a continuous fibrous sheet material such as fiberboard with oil proof parchment so that the parchment extends beyond an edge of the fiberboard, the remaining portion of said fibrous sheet material being left free of parchment on both sides thereof, folding the projecting edge of the parchment over the edge of the fiberboard and securing it to the latter, forming the said composite sheet material into tubular container bodies with said parchment on the inside, and applying metallic container ends to said container bodies so that the ends of the interior parchment wall are engaged with said container ends.

18. The process of manufacturing containers for holding oil, grease and similar products which comprises uniting a portion of one side only of a continuous fibrous sheet material such as fiberboard with oil proof parchment so that the parchment extends beyond an edge of the fiberboard, the remaining portion of said fibrous sheet material being left free of parchment on both sides thereof, folding the projecting edge of the parchment over the edge of the fiberboard and securing it to the latter, applying an oil proof side seam adhesive along one edge of said parchment, severing a blank from one end of said composite sheet material, forming said blank into tubular container bodies with said parchment on the inside and with the meeting parchment edges united by said side seam adhesive in a side seam, and applying gasket lined metallic container ends to said container bodies with the ends of the interior parchment wall engaged with said container ends and sealed by said gasket.

19. The process of manufacturing containers for holding oil, grease and similar products which comprises uniting a portion of one side only of a continuous sheet of fibrous material such as fiberboard with oil proof parchment so that the parchment extends beyond an edge of the fiberboard, the remaining portion of said fibrous sheet material being left free of parchment on both sides thereof, folding the projecting edge of the parchment over the edge of the fiberboard and securing it to the latter, applying an oil proof side seam adhesive along one edge of said parchment, severing a blank from one end of said composite sheet material, forming said blank into tubular container bodies with said parchment on the inside and with the meeting parchment edges united by said side seam adhesive in a side seam, providing metallic container ends each having an annular flange a wall of which carries a resilient, oil proof sealing gasket, and applying said gasket lined ends to said container bodies so that the ends of the interior parchment wall engage with said container ends and with the joint sealed by said gasket.

DONALD G. MAGILL.